US008807441B2

(12) United States Patent
Kim et al.

(10) Patent No.: US 8,807,441 B2

(45) Date of Patent: Aug. 19, 2014

(54) RFID TAG ANTENNA

(75) Inventors: Yong Jun Kim, Seongnam-si (KR); Bo A Jung, Seongnam-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 22 days.

(21) Appl. No.: 13/427,413

(22) Filed: Mar. 22, 2012

(65) Prior Publication Data

US 2012/0241521 A1 Sep. 27, 2012

(30) Foreign Application Priority Data

Mar. 24, 2011 (KR) ........................ 10-2011-0026482

(51) Int. Cl.
*G06K 19/06* (2006.01)

(52) U.S. Cl.
USPC .......................................................... 235/492

(58) Field of Classification Search
USPC .......................................................... 235/492
See application file for complete search history.

(56) References Cited

U.S. PATENT DOCUMENTS 8,390,459 B2 * 3/2013 Kato .......................... 340/572.7

FOREIGN PATENT DOCUMENTS

| | | | |
|---|---|---|---|
| KR | 10-0792345 | B1 | 12/2007 |
| KR | 10-2009-0027477 | A | 3/2009 |
| KR | 10-2009-0092967 | A | 9/2009 |
| KR | 10-2010-0039168 | A | 4/2010 |
| KR | 10-2010-0070855 | A | 6/2010 |
| KR | 10-2010-0086475 | A | 7/2010 |

* cited by examiner

*Primary Examiner* — Jamara Franklin

(74) *Attorney, Agent, or Firm* — Sughrue Mion, PLLC

(57) ABSTRACT

Disclosed are a radio frequency identification (RFID) tag and an RFID tag antenna thereof. The RFID tag antenna includes an antenna pattern which includes: a chip matching pattern which is disposed at a middle portion of the tag antenna, forms a closed loop, and is electrically connected to a chip; a first ejector pattern which is connected to a first side of the chip matching pattern; and a second ejector pattern which is connected to a second side of the chip matching pattern, wherein the first and second ejector patterns are symmetric with respect to the chip matching pattern, and the chip matching pattern includes a gap in the closed loop.

20 Claims, 4 Drawing Sheets

RFID TAG ANTENNA

CROSS-REFERENCE TO RELATED PATENT APPLICATION

This application claims priority from Korean Patent Application No. 10-2011-0026482 filed on Mar. 24, 2011 in the Korean Intellectual Property Office, the disclosure of which is incorporated herein its entirety by reference.

BACKGROUND

1. Field

Apparatuses consistent with exemplary embodiments relate to a radio frequency identification (RFID) tag antenna.

2. Description of the Related Art

Generally, a radio frequency identification (RFID) system utilizes a technology in which a reader automatically recognizes data stored in a tag, a label or a card having a built-in microchip using wireless frequencies. In the RFID system, 125 KHz, 13.56 MHz, 860 to 960 MHz and 2.45 GHz are used as communication frequencies between the RFID tag and the RFID reader. A wireless connection protocol using these frequencies is defined by ISO/IEC 18000, which is an international standard.

Wireless connection methods between the RFID tag and the RFID reader may be classified into a mutual inductance method and an electromagnetic wave method. The mutual inductance method using a coil antenna is mainly used for short distances, whereas the electromagnetic wave method using a high-frequency antenna is mainly used for middle or long distances. Most mutual inductance type RFID tags are passive type tags, each of which is supplied with energy necessary to operate an integrated circuit (IC) chip of the tag from the RFID reader. Active type tags use built-in power supplies, such as batteries.

A chip of a passive type tag serves to decode a signal carried by a radio wave using a signal transmitted from the RFID reader as an energy source and to send information to the RFID reader. To this end, an antenna is attached to the IC chip so that the antenna can receive energy and a signal. This antenna is referred to as an RFID tag antenna. The structure in which the antenna and the chip are combined is referred to as an RFID tag or transponder.

The RFID tag is used in logistics and distribution. In addition, the RFID tag is used for inventory management and history management at a production site. Since RFID performs communication using a radio wave, RFID tends to exhibit poor performance with respect to water or metal in which the radio wave is scattered or absorbed. This phenomenon is severe in high-frequency waves. Such a phenomenon occurs in an ultrahigh frequency (UHF) band (860 to 960 MHz), which is mainly used in East Asia at the present time without exception. For this reason, a metal RFID tag, which exhibits excellent performance with respect to a metal body or a metallic material, is disclosed in Korean Patent Application Publication No. 10-2009-0079185. However, the metal tag is more expensive than a general label tag since the metal tag requires an expensive shielding material. Also, the metal tag is so hard that it is difficult to attach the metal tag to a curved surface.

Meanwhile, a loop antenna, a slot antenna or a dipole antenna is used as the antenna used in the RFID tag. The dipole antenna, left and right sides of which are symmetric with respect to the middle axis of the antenna, are most widely used. Also, the dipole antenna has an advantage in that used wavelengths can be reduced by half.

Also, in most cases, a general antenna has an impedance of 50Ω. For this reason, the antenna is designed using a combination of two patterns for matching. However, the RFID tag uses a chip having a complex number type resistance value, and a related art dipole antenna for tags has a matching unit 12 or 22 between opposite emission patterns as shown in FIGS. 1 and 2 so that the dipole antenna has a value, by which the dipole antenna is conjugate with the chip. For impedance matching, the size of the matching unit 12 or 22 is increased as inherent impedance of the chip is increased, and the size of the matching unit 12 or 22 is decreased as the inherent impedance of the chip is decreased. Also, the matching unit 12 or 22 of the antenna may decide a bandwidth of the antenna. Since the bandwidth of an antenna having no matching unit is decreased, a tag antenna having such a matching unit 12 or 22 is mainly used in wide band applications requiring a large bandwidth at the present time.

A tag antenna having such a matching unit 12 or 22 designed as described above is advantageous to make a wide band tag, and therefore, this tag antenna can be widely used in general applications. However, it is difficult to apply such a tag antenna to a particular form, such as a syringe. That is, in a case in which the related art tag antenna is used for a syringe containing a metallic material 11, the metallic material 11 contained in the syringe affects the tag through the matching unit 12 or 22. For example, the properties of the matching unit 12 of the related art tag antenna as shown in FIG. 1 are changed by the metallic material with a result that the size of the matching unit 12 of the related art tag antenna as shown in FIG. 1 corresponds to that of the matching unit 12 as shown in FIG. 3. If the size of the matching unit 12 is changed as described above, it is not possible to achieve matching based on chip impedance. In this case, recognition performance of the tag is deteriorated. Also, if the matching unit 12 is made larger considering that the size of the matching unit 12 will be decreased, a size of the emission patterns excluding the matching unit is excessively decreased with a result that the tag antenna does not exhibit desired performance.

SUMMARY

Exemplary embodiments are provided to address the above problems. In accordance with an aspect of an exemplary embodiment, there is provided an RFID tag antenna including an antenna pattern, wherein the antenna pattern may include: a chip matching pattern which is disposed at a middle portion of the tag antenna, forms a closed loop, and is electrically connected to a chip; a first ejector pattern which is connected to a first side of the chip matching pattern; and a second ejector pattern which is connected to a second side of the chip matching pattern. The first and second ejector patterns may be symmetric with respect to the chip matching pattern, and the chip matching pattern may include a gap in the closed loop.

The gap may be provided at a portion of the chip matching pattern opposite to a portion of the chip matching pattern at which the chip matching pattern is connected to the chip.

The chip matching pattern may be formed in a polygonal shape such as a quadrangular shape.

The chip matching pattern may be configured such that at least one side of the polygonal shape is bent.

The gap may have a size of 2 mm or less.

The antenna pattern may have a thickness of 0.3 mm to 0.5 mm.

The first and second ejector patterns may have a substantially similar meander structure which may include three vertical patterns.

The meander structure may be configured so that the vertical pattern of the outermost side of the meander structure is formed such that a vertical length of an outermost pattern is greater than a vertical length of any pattern in the meander structure.

The meander structure may have a total length of 8 cm or less.

BRIEF DESCRIPTION OF THE DRAWINGS

The above and other aspects will be more clearly understood from the following detailed description taken in conjunction with the accompanying drawings, in which.

DETAILED DESCRIPTION

Hereinafter, exemplary embodiments will be described in detail with reference to the accompanying drawings. It should be noted, however, that these embodiments are only for illustrative purposes and the scope of the inventive concept is not limited by the illustrated embodiments.

Figure 4:
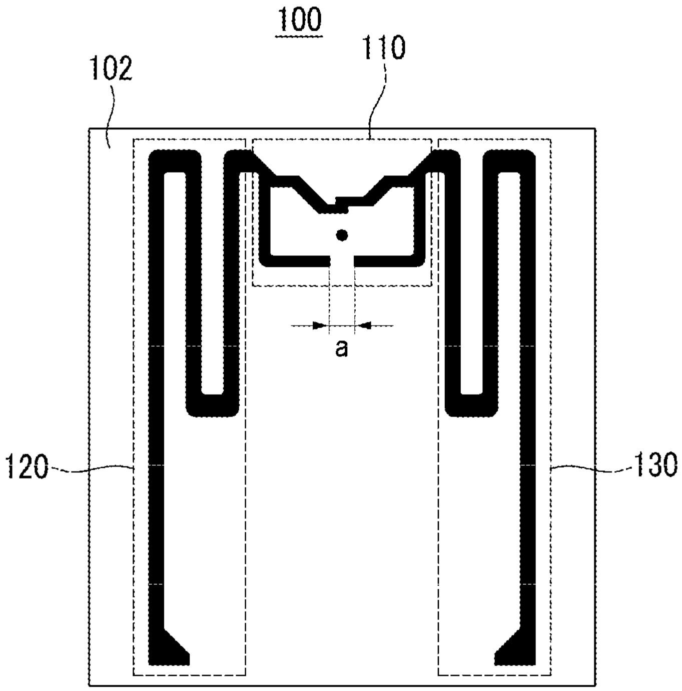
FIG. 4 is a view showing a dipole label tag antenna according to an exemplary embodiment.

FIG. 4 is a view showing a radio frequency identification (RFID) tag antenna 100 according to an exemplary embodiment which can be applied to a syringe containing a metallic material As shown in FIG. 4, the RFID tag antenna 100 according to the embodiment may include a label film 102 and an antenna pattern attached to the label film 102. The antenna pattern includes a chip matching pattern 110 which is disposed at the middle of the label film 102, forms a closed loop, and is electrically connected to a chip. The closed loop may take a substantially symmetrical form with respect to a middle vertical axis of the RFID tag antenna 100. The antenna pattern also includes a first ejector pattern 120, which is connected to one side of the chip matching pattern 110 and is configured to have a meander structure, and a second ejector pattern 130 which is connected to the other side of the chip matching pattern 110 and is also configured to have the meander structure. The first ejector pattern 120 and the second ejector pattern 130 are substantially symmetric with respect to the chip matching pattern, preferably but not necessarily with respect to the middle vertical axis of the RFID tag antenna 100. The chip matching pattern 110 has a gap located at a portion of the chip matching pattern 110 opposite to a portion of the chip matching pattern 110 at which the chip matching pattern 110 is connected to the chip.

As shown in FIG. 4, the first ejector pattern 120 is connected to a left side of the chip matching pattern 110 disposed at the middle of the label film 102, and the second ejector pattern 130 is connected to a right side of the chip matching pattern 110 disposed at the middle of the label film 102. Alternatively, the first ejector pattern 120 may be connected to the right side of the chip matching pattern 110, and the second ejector pattern 130 may be connected to the left side of the chip matching pattern 110. However, the positional relationship between the first ejector pattern 120 and the second ejector pattern 130 is not limited thereto. That is, the arrangement of the first ejector pattern 120 and the second ejector pattern 130 according to the embodiment is not particularly restricted.

The label film 102 is configured in a form of a label to which an RFID chip and an antenna are attached so that the RFID chip and the antenna can be easily attached to products made of various materials, such as glass, plastic, paper, leather and wood.

The chip matching pattern 110 is electrically connected to the chip in a direct manner. The chip matching pattern 110, electrically connected to the chip, forms a closed loop having a gap provided at a portion thereof. The closed loop, including the gap, has a predetermined size, by which the chip matching pattern 110 can secure a wide bandwidth for wireless communication with a RFID reader and, in addition, can achieve impedance matching in response to impedance of the chip, which has an imaginary number value.

Figure 1:
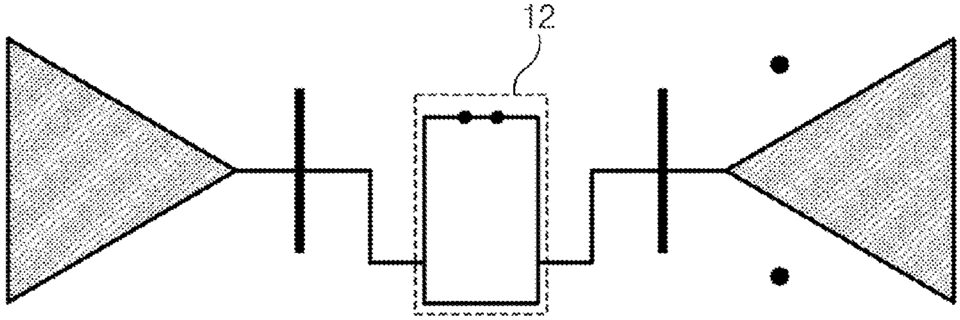
FIG. 1 (RELATED ART)
FIG. 1 is a view schematically showing a related art half-wavelength dipole radio frequency identification (RFID) tag antenna.
Figure 2:
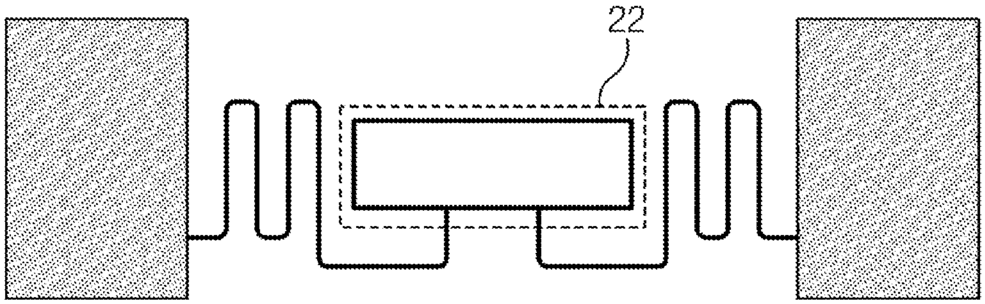
FIG. 2 (RELATED ART)
FIG. 2 is a view schematically showing another related art half-wavelength dipole RFID tag antenna.
Figure 3:
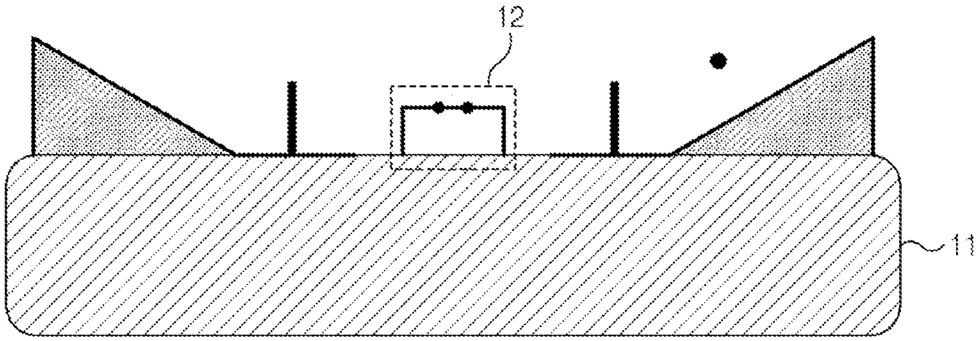
FIG. 3 (RELATED ART)
FIG. 3 is a view showing change in properties of the antenna shown in FIG. 1 when the antenna is applied to a syringe containing a metallic material.

That is, the chip matching pattern 110 according to the embodiment has a gap provided at a portion thereof, by which the chip matching pattern 110 is different from the related art matching unit 12 or 22 as shown in FIGS. 1 to 3.

The RFID tag antenna pattern according to the embodiment is shown in FIG. 4. As shown in FIG. 4, the chip matching pattern 110 of the RFID tag antenna is configured in a form of a quadrangular closed loop. However, the inventive concept is not limited thereto. The closed loop may take any polygonal shape. The chip is connected to the middle of an upper side of the closed loop. In the closed loop, at least one side, i.e. the upper side, is bent, and a gap "a" is formed at the middle of a side opposite to the bent side. The gap "a" is provided by disconnecting the closed loop of the chip matching pattern 110 for a predetermined distance. The gap "a" may have a size of 0.01 mm to 2 mm, and the antenna pattern may have a thickness of 0.3 mm to 0.5 mm.

Also, the meander structure of each of the first and second ejector patterns 120 and 130 includes three vertical patterns, which are obtained by bending a vertical straight pattern twice. A vertical length of an outermost pattern in the meander structure is formed to be greater than that of any pattern in the meander structure. The meander structure configured as described above has a total length of 8 cm or less.

As can be seen from the above description, the RFID tag antenna 100 according to the embodiment does not include a matching unit of a related art tag antenna, and, in addition, the RFID tag antenna according to the embodiment exhibits excellent performance with respect to an object containing a metallic material. Specifically, the related art matching unit 12 or 22 as shown in FIGS. 1 to 3 is replaced by the chip matching pattern 110 having the gap "a", and each of the ejector patterns is configured to have a meander structure, which improves a coupling effect. Consequently, it is possible to improve such a coupling effect and reduce the size of an RFID tag antenna.

The RFID tag antenna pattern according to the embodiment exhibits excellent performance as the size of the gap "a" is increased within a range of 0 to 2 mm. Also, the RFID tag antenna pattern according to the embodiment exhibits excellent performance when the thickness of the RFID tag antenna pattern is 0.3 to 0.5 mm.

Experiments indicated that, if the size of the gap "a" of the chip matching pattern 110 exceeds 2 mm, recognition performance of an RFID tag having the tag antenna 100 according to the embodiment is rapidly deteriorated. Also, the experiments indicated that, if a total length of the meander structure of each of the ejector patterns 120 and 130 exceeds 8 cm, the recognition performance of the RFID tag having the tag antenna 100 according to the embodiment is rapidly deteriorated.

Also, if the tag antenna 100 according to the embodiment is used for a syringe containing a metallic material, the recognition performance of the RFID tag having the tag antenna 100 according to the embodiment is affected by an amount of the material contained in the syringe.

Figure 5A:
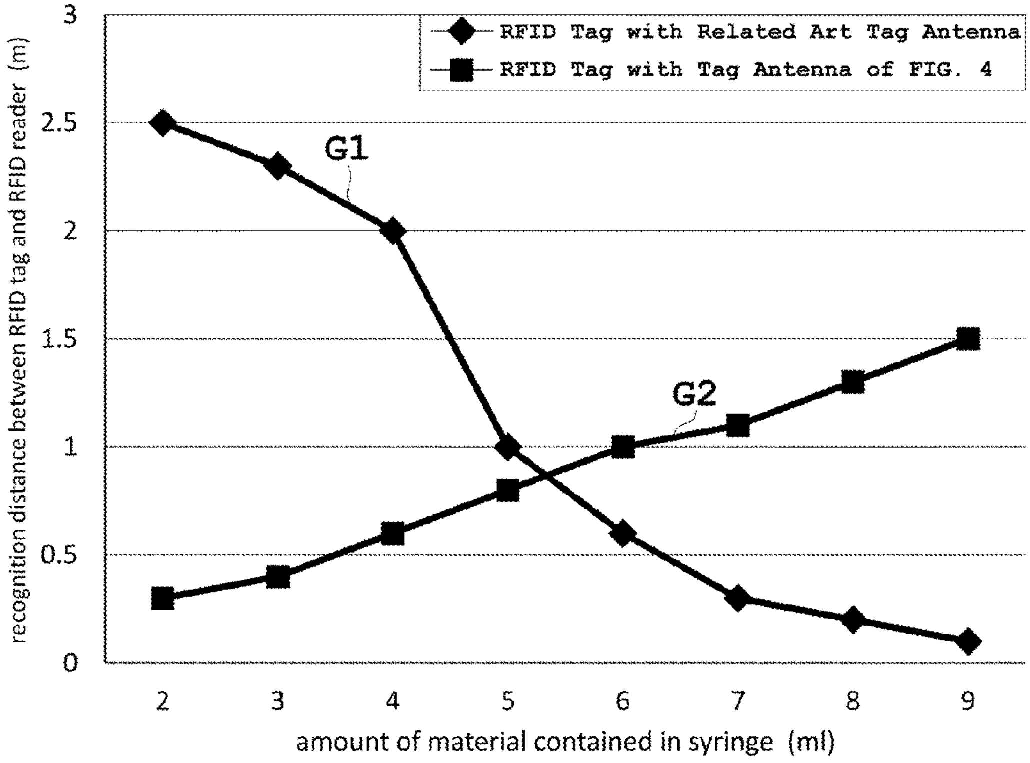
FIG. 5A and FIG. 5B are graphs showing change in recognition performance of an RFID tag antenna of FIG. 4, according to an exemplary embodiment.

For example, FIG. 5A is a graph showing change in the recognition performance of the RFID tag having the tag antenna 100 according to the embodiment, in view of change of the amount of the metallic material contained in the syringe. The vertical axis (Y axis) indicates the recognition distance between the RFID tag having the tag antenna 100 and the RFID reader, and the horizontal axis (X axis) indicates the amount of the material ranging from 2 ml to 9 ml at intervals of 1 ml, contained in the syringe having a capacity of 10 ml.

The graph of FIG. 5A is represented as shown in Table 1.

TABLE 1

| amount of material contained in syringe (ml) | Recognition distance between RFID tag and RFID reader (m) Related Art | Tag Antenna of FIG. 4 |
|---|---|---|
| 2 | 2.5 | 0.3 |
| 3 | 2.3 | 0.4 |
| 4 | 2 | 0.6 |
| 5 | 1 | 0.8 |
| 6 | 0.6 | 1 |
| 7 | 0.3 | 1.1 |
| 8 | 0.2 | 1.3 |
| 9 | 0.1 | 1.5 |

Figure 5B:
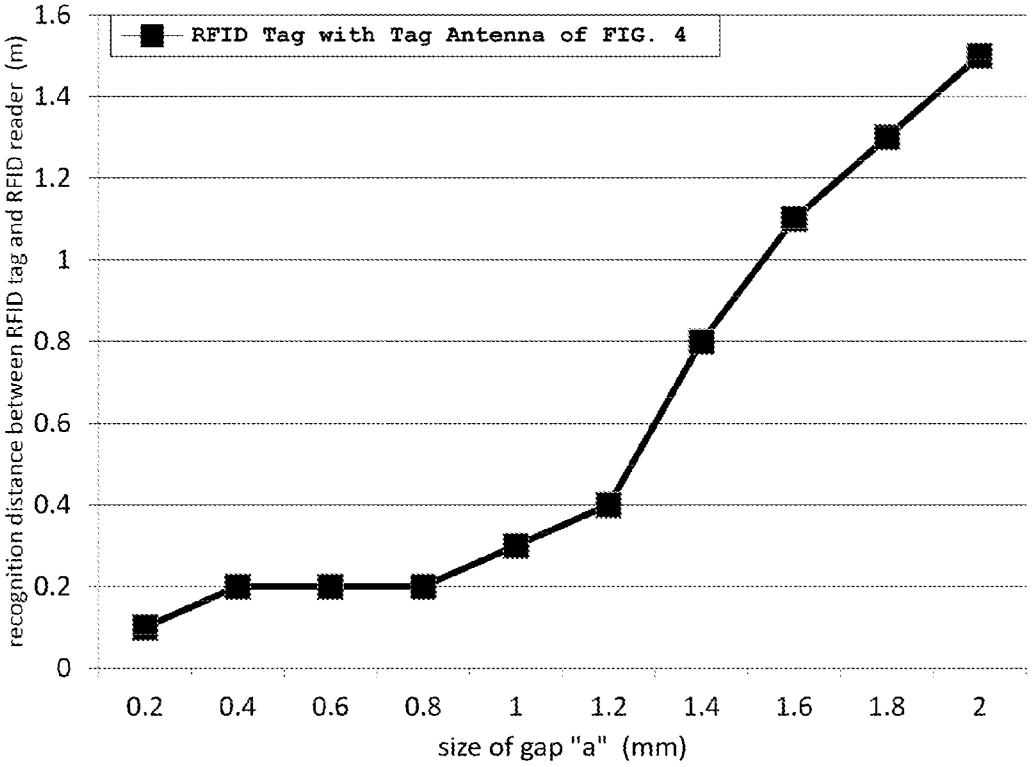

Also, FIG. 5B is a graph showing change in the recognition performance of the RFID tag having the tag antenna 100 according to the embodiment, in view of change of the size of the gap "a". The vertical axis (Y axis) indicates the recognition distance between the RFID tag having the tag antenna 100 and the RFID reader, and the horizontal axis (X axis) indicates the size of the gap "a" ranging from 0 ml to 2 ml at intervals of 0.2 ml.

The graph of FIG. 5B is represented as shown in Table 2.

TABLE 2

| size of gap "a" (mm) | Recognition distance between RFID tag and RFID reader (m) Tag Antenna of FIG. 4 |
|---|---|
| 0.2 | 0.1 |
| 0.4 | 0.2 |
| 0.6 | 0.2 |
| 0.8 | 0.2 |
| 1.0 | 0.3 |
| 1.2 | 0.4 |
| 1.4 | 0.8 |
| 1.6 | 1.1 |
| 1.8 | 1.3 |
| 2.0 | 1.5 |

Referring to the graph of FIG. 5A and Table 1, a graph G1 for an RFID tag having a related art tag antenna with a matching unit such as the matching unit 11 or 12 shown in FIGS. 1 to 3 indicates that recognition performance of the RFID tag is decreased as the amount of material contained in the syringe increases. A graph G2 for an RFID tag having the tag antenna 100 according to the embodiment indicates that recognition performance of the RFID tag is increased as the amount of material contained in the syringe decreases. In particular, FIG. 5A shows that the recognition performance of the RFID tag having the tag antenna 100 according to the embodiment is best when the amount of the material contained in the syringe having a capacity of 10 ml is 8 to 9 ml. Also referring to the graph of FIG. 5B and Table 2, the recognition performance of the RFID tag having the tag antenna 100 according to the embodiment is increased as the size of the gap "a" approaches 2 mm.

As described above, the tag antenna 100 according to the embodiment is affected by the amount of the material contained in the syringe. Although a position at which the tag antenna 100 is attached may be changed depending upon the amount of the material contained in the syringe, it is preferable, but not necessary, to attach the tag antenna 100 according to the embodiment to the syringe so that the top surface of the metallic material contained in the syringe reaches half of the vertical height of the chip matching pattern 110, whereby the recognition performance of the RFID tag is improved. That is, as shown in FIG. 4, it is preferable, but not necessary to attach the tag antenna 100 so that the top surface of the metallic material contained in the syringe reaches a mark formed at a center of the chip matching pattern 110. In this case, the amount of the material contained in the syringe having a capacity of 10 ml is 8 to 9 ml.

In the embodiment as described above, the RFID tag antenna is used to manage syringes. However, the RFID tag antenna according to the embodiment may be used to manage small-sized electronic products and printed circuit boards (PCB).

According to the inventive concept, it is possible to apply a label tag, which is easily attached and moderate in price, instead of a metal tag, to a syringe containing a metallic material.

Although the exemplary embodiments have been disclosed for illustrative purposes, those skilled in the art will appreciate that various modifications, additions and substitutions are possible, without departing from the scope and spirit of the inventive concept as disclosed in the accompanying claims.

What is claimed is:

1. A radio frequency identification (RFID) tag antenna comprising a label film and an antenna pattern attached to the label film, wherein the antenna pattern comprises:

a chip matching pattern which is disposed at a middle portion of the tag antenna, forms a closed loop, and is electrically connected to a chip;

a first ejector pattern which is connected to a first side of the chip matching pattern; and a second ejector pattern which is connected to a second side of the chip matching pattern, wherein the first and second ejector patterns are symmetric with respect to the chip matching pattern, wherein the chip matching pattern comprises a gap in the closed loop, and wherein the label film does not comprise a metallic material.

2. The RFID tag antenna according to claim 1, wherein the gap is configured to disconnect the closed loop of the chip matching pattern.

3. The RFID tag antenna according to claim 2, wherein the gap is provided in a middle portion of the chip matching pattern.

4. The RFID tag antenna according to claim 3, wherein the closed loop of the chip matching pattern takes a substantially symmetrical form with respect to a middle vertical axis of the RFID tag antenna.

5. The RFID tag antenna according to claim 4, wherein the first and second ejector patterns are substantially symmetrical with respect to the middle vertical axis of the RFID tag antenna.

6. The RFID tag antenna according to claim 5, wherein the first and second ejector patterns have a substantially similar meander structure.

7. The RFID tag antenna according to claim 6, wherein the meander structure is configured such that a vertical length of an outermost pattern is greater than a vertical length of any pattern in the meander structure.

8. The RFID tag antenna according to claim 7, wherein the chip matching pattern forms a polygonal closed loop, and at least one side of the polygonal loop is bent.

9. The RFID tag antenna according to claim 2, wherein the closed loop of the chip matching pattern takes a substantially symmetrical form with respect to a middle vertical axis of the RFID tag antenna, and wherein the first and second ejector patterns are substantially symmetrical with respect to the middle vertical axis of the RFID tag antenna.

10. The RFID tag antenna according to claim 9, wherein the first and second ejector patterns have a substantially similar meander structure, and wherein the chip matching pattern forms a polygonal closed loop, and at least one side of the polygonal loop is bent.

11. The RFID tag antenna according to claim 1, wherein the gap is provided at a portion of the chip matching pattern opposite to a portion of the chip matching pattern at which the chip matching pattern is connected to the chip.

12. The RFID tag antenna according to claim 1, wherein the chip matching pattern forms a polygonal shape.

13. The RFID tag antenna according to claim 12, wherein the chip matching pattern is configured such that at least one side of the polygonal shape is bent.

14. The RFID tag antenna according to claim 1, wherein the gap has a size of 2 mm or less.

15. The RFID tag antenna according to claim 1, wherein the antenna pattern has a thickness of 0.3 mm to 0.5 mm.

16. The RFID tag antenna according to claim 1, wherein the first and second ejector patterns have a substantially similar meander structure, and the meander structure comprises three vertical patterns.

17. The RFID tag antenna according to claim 1, wherein the first and second ejector patterns have a substantially similar meander structure, and the meander structure is configured such that a vertical length of an outermost pattern is greater than a vertical length of any pattern in the meander structure.

18. A radio frequency identification (RFID) tag comprising a label film, a chip attached to the label film, and a tag antenna having an antenna pattern and attached to the label film, wherein the antenna pattern comprises:

a chip matching pattern which is disposed at a middle portion of the tag antenna, forms a closed loop, and is electrically connected to a chip;

a first ejector pattern which is connected to a first side of the chip matching pattern; and a second ejector pattern which is connected to a second side of the chip matching pattern, wherein the first and second ejector patterns are symmetric with respect to the chip matching pattern, and wherein the chip matching pattern comprises a gap in the closed loop which disconnects the closed loop for a predetermined distance, and wherein the label film does not comprise a metallic material.

19. The RFID tag of claim 18, wherein the gap is provided in a middle portion of the chip matching pattern, wherein the closed loop of the chip matching pattern takes a substantially symmetrical form with respect to a middle vertical axis of the RFID tag antenna, wherein the first and second ejector patterns are substantially symmetrical with respect to the middle vertical axis of the RFID tag antenna, and wherein the first and second ejector patterns have a substantially similar meander structure.

20. The RFID tag of claim 19, wherein the chip matching pattern forms a polygonal closed loop, and at least one side of the polygonal loop is bent, and wherein the chip matching pattern forms a polygonal closed loop, and at least one side of the polygonal loop is bent.

* * * * *